July 11, 1950
V. F. ZAHODIAKIN
2,514,922
FASTENING DEVICE
Filed Dec. 10, 1947
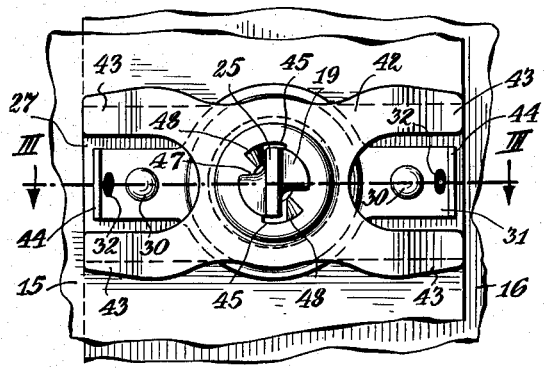
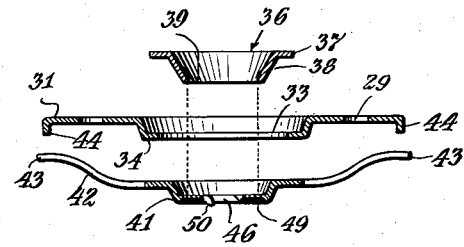
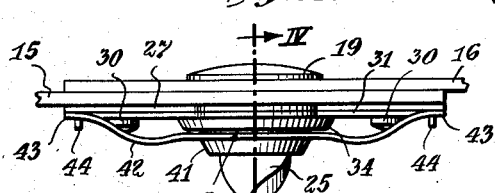
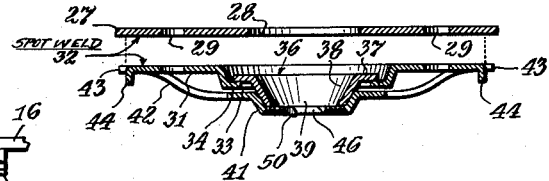
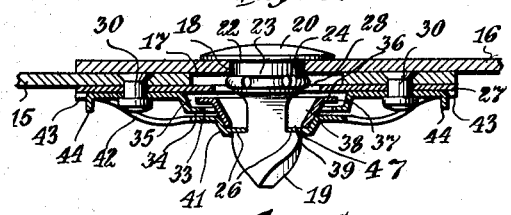
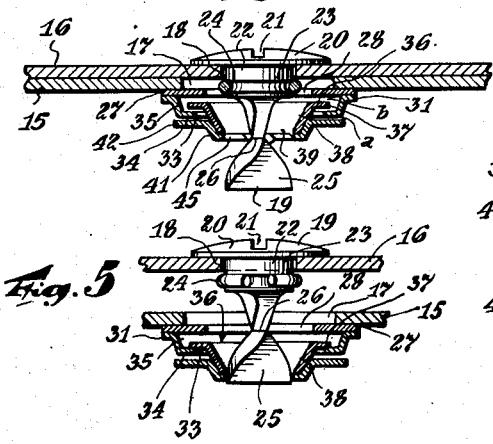
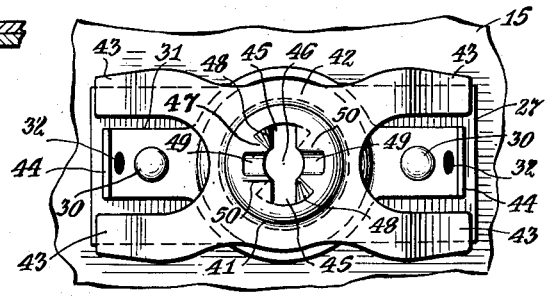
INVENTOR
VICTOR F. ZAHODIAKIN.
BY
Howard P. King
ATTORNEY Patented July 11, 1950

2,514,922

UNITED STATES PATENT OFFICE 2,514,922

FASTENING DEVICE

Victor Fillipobitch Zahodiakin, Short Hills, N. J.

Application December 10, 1947, Serial No. 790,863

5 Claims. (Cl. 24—221)

This invention relates to fastening devices, and particularly to the stud and socket type wherein by partial turn of the stud, an interlocking with the socket is obtained.

In fastening devices of the general character above specified, some difficulty has been encountered in use due to the stud-receiving holes of the members being secured, not registering with requisite precision. The present invention primarily is directed to overcoming the difficulty and in accommodating the discrepancy.

More specifically, an object of the invention is to provide a fastening device which is capable of positive clamping a plurality of members which happen to be misaligned at maximum tolerance discrepancy in location of the supposedly registering holes provided for receiving the clamping stud.

A further object of the invention is to assure direct pull, without introduction of transverse moments of force, in the assembled structure employing my improved fastening device.

Another object of the invention is to accommodate the misalignment in any radial direction of the holes and stud.

Yet another object of the invention is to provide a definite limitation or stop for compression of the resilient cam plate under spreading impetus of the clamped members occurring in use.

Still further objects of the invention will appear to those skilled in the art to which it appertains as the description proceeds, both by direct recitation thereof and by implication from the context.

Referring to the accompanying drawing in which like numerals of reference indicate similar parts throughout the several views;

Figure 1 is a plan of the assembled fastening device of the present invention;

Figure 2 is an edge view of the same;

Figure 3 is a sectional view on line III—III of Fig. 1, showing the device in locked condition;

Figure 4 is a sectional view on line IV—IV of Fig. 2, and showing the device in its unlocked condition;

Figure 5 is another sectional view similar to Fig. 4 with the stud unlocked and in partially withdrawn position;

Figure 6 is an exploded sectional view of the retainer and the cam plate and eyelet or guide;

Figure 7 is a similar sectional view of the parts of Fig. 6, assembled and showing in exploded arrangement therewith the attaching or base plate and a part of a member to which the device is to be applied;

Figure 8 is an enlarged view of portions of the several parts of Fig. 7, showing the same in assembled relation; and Fig. 9 is a plan similar to Fig. 1, but with the stud not assembled therewith.

In the specific embodiment of the invention illustrated in said drawings, the reference numerals 15, 16 designate juxtaposed members adapted to be clamped together in an overlapped flatwise position. For convenience in making distinguishing reference thereto, the members will be arbitrarily referred to as inner member 15 and outer member 16. Particular attention has been given to aircraft construction and requirements in the development of the present invention, and it may therefore not be amiss to point out that various parts of airplanes, such as wing and fuselage plates, cowls, hoods and other parts are lapped and secured together. It has become quite common practice to now use some form of stud and socket securing means in place of rivets and bolts.

The parts or members to be secured are prepunched or drilled with holes 17, 18 which are intended to register when the members are assembled. Actually, however, because of tolerances allowed or inaccuracies of workmanship, the holes may not register with absolute precision and where the holes are no larger than necessary for a particular stud, misalignment of even very small amounts will make insertion of the stud difficult or often impossible. The inner member 15 therefore may provide a hole larger than necessary with exact registration, so that the stud will pass even though registration is imperfect. Thus, in the drawing, hole 17 of the inner member is shown much larger than hole 18 of the outer member 16.

A stud 19 is provided having head 20 with kerf 21 in its outer end and a cylindrical neck 22 immediately under the head so proportioned that the neck will have rotatable fit in hole 18 and the head will have adequate bearing upon the face of the outer member 16. Beyond neck 22, the stud has a peripheral groove 23 to receive a resilient split ring 24 next the opposite face of outer member 16 from that engaged by head 20 thereby retaining the stud rotatably in and projecting from said member 16. This assembly of stud in said member may be accomplished in the field or place where the members are being assembled. The projecting part of the stud is constructed as a helical blade 25 providing undercut or transverse shoulders 26 at a common planar distance from the head and inwardly toward the head from the far end of the blade.

The socket-providing mechanism to cooperate with the stud is constructed as a unitary assembly to be later secured in place, in the field or elsewhere, upon inner member 15. Here again inaccuracy of registration may transpire, and a feature of the invention is to accommodate misalignment of the socket assembly when applied to member 15.

The unitary socket-providing assembly comprises an attaching or base plate 27 here shown as a flat rectangle of heavy sheet metal with a stud hole 28 at its middle large enough to pass the stud therethrough even though said hole is not precisely aligned with the hole of either member when assembled in the field or elsewhere on member 15. Rivet holes 29 are provided in this plate to ultimately receive, when applying the assembly for use on member 15, rivets 30. A convenient location for said rivet holes is upon the longitudinal center line of said plate near opposite ends thereof.

Juxtaposed lengthwise upon said plate in symmetrical disposition with respect to hole 28 thereof and center lines of the plate passing through the center of curvature of said hole, is a retainer 31 spot welded, as at 32, near its ends for maintaining permanent union of the plate and retainer. The retainer is elongated in character and extends longitudinally of said plate. Aforementioned rivet holes 29 are preferably drilled or punched after spot welding the retainer on the plate and thus said rivet holes are provided through both the plate and retainer in perfect alignment. The middle part of the retainer is provided with a stud hole 33 registering axially as nearly as practical with the stud hole 28 of the plate but enough larger than said stud to accommodate any reasonable misalignment. The marginal region circumferentially around the stud hole 33 of the retainer is off-set away from the base plate so as to provide a peripheral lip 34 around said hole parallel to and at a predetermined distance from the face of the base plate. An annular pocket 35 is thus provided coaxial to the stud holes of and between the base plate and retainer.

An eyelet 36 having a peripheral end flange 37 is loosely mounted in said pocket, the flange being located between the said lip 34 of the retainer and said base plate and larger in diameter than the stud holes of either the plate or retainer so as to be irremovable therethrough. The axially longitudinal or riser portion 38 of the eyelet has less diameter than and projects through the stud hole 33 of the retainer with considerable play so the eyelet may move in all lateral directions adequate distances to accommodate any reasonable misalignment of other stud holes. Also, said riser portion 38 of the eyelet is hollow and slopes inwardly toward its axis from the said flanged end toward its end protruding from the retainer. Said protruding end of the eyelet provides a stud hole 39 of a diameter substantially equal to the blade diameter of the stud enabling the stud to be inserted at its blade end therein. Upon insertion of the stud in the eyelet next the flanged end of the eyelet, any misalignment of stud and eyelet is corrected by the engagement of the stud against the sloping riser of the eyelet shifting the eyelet laterally until it aligns and the stud passes through stud hole 39 thereof.

The protruding end of eyelet 36 is welded or otherwise made secure to the inner face of the hollowed annular embossment 41, within which said end fits, of a resilient cam plate or shiftable bridge 42. By preference this bridge extends in the same general longitudinal direction as said retainer and provides feet 43 at each corner which rest and are slidable flatwise upon the same surface of the base plate to which the retainer is attached. Said feet straddle the end portions of the retainer and have adequate clearance therefrom to enable the bridge to slide or shift laterally in any direction parallel to the base plate to the full extent of corresponding shift of the eyelet in its pocket in adjusting to axial coincidence with the stud in use. Upturned lugs 44 at the ends of the retainer keep the bridge feet from riding onto said retainer. The bridge bulges from said feet toward the embossment at its middle thereby clearing the underlying portions of the retainer and thereby locating the embossment in overlying relation to the raised lip of the retainer.

Fabricating procedure contemplates assembly of the eyelet through the stud hole of the retainer and applying and then welding the bridge upon the projecting end of said eyelet. The retainer is consequently then permanently but loosely kept inseparable from the assembled eyelet and bridge. Next the retainer is applied in its proper location from the base plate and spot welded thereto as previously described. In this manner, the plate and retainer are made integral with each other and may be considered as a unit and referred to as a fixed part. The eyelet and bridge which are welded together as another unit, and having play with respect to the said fixed part, may be referred to as the movable part.

By virtue of the inherent resiliency of the bridge, the eyelet is maintained normally in unlocked condition of stud, with the eyelet flange pressed outwardly against the overlapping lip of the retainer. In locked condition of the stud, the bridge is depressed in opposition to its inherent resiliency and is limited as to depression by engagement of the bridge, around the base of the embossment, with the outer face of said lip. Thus said lip constitutes a stop in both directions of resilient movement of the bridge in a direction axially of the stud. In the drawing, spacing distance lettered $a$ of permitted inward movement of the bridge toward the lip is less than the clearance space, lettered $b$, between the eyelet flange and the base plate so as to assure adequate depressibility of the bridge but predetermined in extent by said lip. It may also be added at this time, that distance $a$ is not reduced to zero in locked position, but still leaves enough clearance for the stud blade to ride over its cams, described hereinafter, but still is reduced nearly to zero and thus prevents any material or objectionable separation of the members 15, 16 in use, due to extraneous opposite pressures, since the bridge, in locked position of stud, is in close proximity to the lip as a positive stop.

The embossment 41 of cam plate or bridge 42 provides diametrically opposed notches 45 radiating from a central hole 46 which together provide a double key hole slot for reception and passage of the helical blade of the stud. Rotation of the stud in said slot draws the resilient bridge inward at its middle until the shoulders of the blade come out of the slot and then ride upon the inwardly directed overhang or ledge 47 of the embossment. Said overhang, in the same direction from each notch, for instance anti-clockwise with respect thereto as viewed in Fig. 1, provides outwardly or forwardly sloping cams 48 requiring further deflection of the bridge as the shoulders of the stud blade ride thereover, said cams terminating in radially disposed depressions 49 into which said shoulders will seat in finally passing over the cams. Raised stops 50 at the far sides of the depressions are provided in the embossment to prevent rotation of the stud past the seated position of the stud shoulders in said depressions.

It will be recognized from the above description and showing in the drawing, that partial flattening and retractive bowing of the resilient bridge or cam plate is permitted by slidable engagement of the bridge feet on the surface of the base plate against which they are resiliently pressed. It also will be recognized that the base plate, retainer, eyelet and bridge or cam plate are fabricated as a unitary assembly constituting a socket member which may be readily and conveniently attached as an entity to one of a plurality of members where intended to be used, and that the floating mounting of the movable part of that assembly or socket member will accommodate a very considerable latitude of misalignment of the stud holes of the members and of the stud hole of the fixed part with respect to the stud hole of the member to which said fixed part is attached by the person applying the socket member in place. Choice of length of studs can be made to accommodate existing thickness of the members 15, 16 being secured by my improved fastening device.

I claim:

1. A fastening device for juxtaposed members to be clamped together, comprising a socket structure and a rotatable stud for interlocking therewith, said socket structure providing an eyelet and a resilient bridge united together and constituting a movable part for engagement by said stud, and a retainer interposed between areas of said eyelet and bridge and affording movable retention of said movable part on said retainer.

2. A fastening device for juxtaposed members to be clamped together, comprising a socket structure and a rotatable stud for interlocking therewith, said socket structure providing a resilient bridge having an embossment between the ends thereof, said embossment having a stud-receiving hole therein, an eyelet having a flange and a riser with the height of the riser exceeding the depth of said embossment and the margin of the riser engaging within said embossment, and a retainer having a lip between said eyelet flange and said bridge for retaining said eyelet from escape from the retainer in the direction of said bridge.

3. A fastening device for juxtaposed members to be clamped together, comprising a socket structure and a rotatable stud for interlocking therewith, said socket structure providing a resilient bridge having an embossment between the ends thereof, said embossment having a stud-receiving hole therein, an eyelet having a flange and a riser with the height of the riser exceeding the depth of said embossment and the margin of the riser engaging within said embossment, and a retainer having a lip between said eyelet flange and said bridge for retaining said eyelet from escape from the retainer in the direction of said bridge, and said eyelet riser being permanently secured to said embossment and spacing the eyelet flange from the bridge in excess of the thickness of the retainer lip for affording axial movement of the eyelet in said retainer.

4. A fastening device for juxtaposed members to be clamped together, comprising a socket structure and a rotatable stud for interlocking therewith, said socket structure providing a resilient bridge having pairs of feet at opposite ends thereof, a mid-part of said bridge having a stud-receiving hole and bridge-depressing means thereat, a plate under said feet, a retainer secured to said plate and having an inwardly directed lip at its mid-part, said bridge having a first part thereof overlying said lip and having a second part underlying said lip, said first and second parts being fixed with respect to each other and receiving and retaining said lip loosely therebetween and for retaining said bridge with its feet in engagement with said plate, said retainer extending between feet of the said pairs and having a width less than the space between the feet of the pair of feet and located in the path of lateral movement of said feet, thereby limiting rotation of the bridge on said plate yet accommodating limited longitudinal and rotational movement of the bridge on said plate and with respect to said retainer.

5. A fastening device for juxtaposed members to be clamped together, comprising a socket structure and a rotatable stud for interlocking therewith, said socket structure providing a resilient bridge having pairs of feet at opposite ends thereof, a mid-part of said bridge having a stud-receiving hole and bridge depressing means threat, a plate under said feet, a retainer secured to said plate and having an inwardly directed lip at its mid-part, said bridge having means at its mid-part providing loose interengagement of said lip above and below and within said lip and retaining the bridge assembled on the said retainer with the feet of said bridge in engagement with said plate, said retainer extending between and having upstanding lugs between said feet of the said pairs adapted to be engaged laterally by said feet and thereby limiting rotation of the bridge on said plate yet accommodating limited longitudinal and rotational movement of the bridge on said plate and with respect to said retainer.

VICTOR FILLIPOBITCH ZAHODIAKIN.

REFERENCES CITED

The following references are of record in the file of this patent:

UNITED STATES PATENTS

| Number | Name | Date |
| --- | --- | --- |
| 2,322,614 | Bedford | June 22, 1943 |
| 2,327,331 | Pender | Aug. 17, 1943 |
| 2,337,483 | Marty | Dec. 21, 1943 |
| 2,356,412 | Jones | Aug. 22, 1944 |
| 2,367,812 | Venditty | Jan. 23, 1945 |
| 2,389,121 | Churchill | Nov. 20, 1945 |
| 2,414,272 | Poupitch | Jan. 14, 1947 |